in

US011269602B2

(12) United States Patent
Escoffier et al.

(10) Patent No.: US 11,269,602 B2
(45) Date of Patent: Mar. 8, 2022

(54) DETECTING NATIVE COMPILATION INCOMPATIBILITIES

(71) Applicant: Red Hat, Inc., Raleigh, NC (US)

(72) Inventors: Clement Escoffier, Valence (FR); Stuart Douglas, Orange (AU)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/875,414

(22) Filed: May 15, 2020

(65) Prior Publication Data

US 2021/0357191 A1   Nov. 18, 2021

(51) Int. Cl.
*G06F 9/44*   (2018.01)
*G06F 8/41*   (2018.01)
*G06F 8/30*   (2018.01)

(52) U.S. Cl.
CPC ............... *G06F 8/427* (2013.01); *G06F 8/30* (2013.01)

(58) Field of Classification Search
CPC .................................. G06F 8/30; G06F 8/427
See application file for complete search history.

(56) References Cited

U.S. PATENT DOCUMENTS

| 6,289,506 | B1 | 9/2001 | Kwong et al. |
| 6,542,891 | B1 * | 4/2003 | Loen ........................ G06F 9/52 |
| | | | 707/704 |
| 8,347,272 | B2 | 1/2013 | Sugawara et al. |
| 8,572,572 | B2 | 10/2013 | Morgan et al. |
| 8,949,103 | B2 | 2/2015 | Brewis et al. |
| 10,521,208 | B2 | 12/2019 | Brown et al. |
| 10,949,171 | B1 * | 3/2021 | Chiluvuri ................... G06F 8/73 |
| 2003/0191847 | A1 * | 10/2003 | Vion-Dury .............. G06F 8/427 |
| | | | 709/229 |
| 2006/0156286 | A1 * | 7/2006 | Morgan ..................... G06F 8/51 |
| | | | 717/124 |

(Continued)

FOREIGN PATENT DOCUMENTS

| CN | 103793650 | 5/2014 |
| JP | 5811859 | 11/2015 |

OTHER PUBLICATIONS

Xu et al., "Dynamic Purity Analysis for Java Programs", School of Computer Science, McGill University Montreal, Quebec, Canada, PASTE'07 Jun. 13-14, 2007, San Diego, California, USA (8 pages).

*Primary Examiner* — Wei Y Zhen
*Assistant Examiner* — Amir Soltanzadeh
(74) *Attorney, Agent, or Firm* — K&L Gates LLP (57) ABSTRACT

A system includes a memory and a processor. The memory is in communication with the processor. The processor is configured to execute receiving a source code of an application that is compilable into an interpreted configuration. A database is then accessed, where the database includes a first plurality of patterns that are compilable into an interpreted configuration and fail to compile into a native compiled configuration. Within the database, a first plurality of patterns is associated with a first alternative pattern that is compilable into the interpreted configuration and compilable into the native compiled configuration. The source code is parsed to create a second plurality of patterns and analyzed with the first plurality of patterns to determine whether a corresponding pattern exists. Upon determining that the corresponding pattern exists, the corresponding pattern is added to a change list and then outputted.

18 Claims, 5 Drawing Sheets

(56) References Cited

U.S. PATENT DOCUMENTS

| | | | |
|---|---|---|---|
| 2007/0180430 A1* | 8/2007 | Farchi | G06F 11/36 717/126 |
| 2008/0148060 A1* | 6/2008 | Thorell | G06F 21/51 713/187 |
| 2009/0328002 A1* | 12/2009 | Lin | G06F 11/3612 717/120 |
| 2011/0225572 A1* | 9/2011 | Stoicescu | G06F 8/4434 717/156 |

* cited by examiner

DETECTING NATIVE COMPILATION INCOMPATIBILITIES

BACKGROUND

Computer systems may run applications or services that are provided via a server or cloud. The applications or services can be developed and deployed at runtime. Application instances or services may run within containers, which may be run on physical or virtual machines. The containers may be used to separate various components of a computing system. For example, different components of a computing system may be executed at different containers and/or virtual machines executing on a computing device or multiple computing devices.

The containers may encapsulate a runtime environment for an application instance or service. Application instances may be started or replicated across nodes and each application instance may require configuration objects (e.g., lists, collections, arrays, etc. used for configuration), classes, artifacts, dependencies, annotations, libraries, etc. to be loaded at various times.

SUMMARY

The present disclosure provides new and innovative systems and methods for detecting native compilation incompatibilities using static analysis of source code. In an example, a method includes receiving a source code of an application that is compilable into an interpreted configuration. A database is accessed, where the database includes a first plurality of patterns that are compilable into the interpreted configuration and fail to compile into a native compiled configuration. The database includes a first pattern that is associated with a first alternative pattern that is compilable into the interpreted configuration and compilable into the native compiled configuration. The source code is parsed to create a second plurality of patterns. The first plurality of patterns and second plurality of patterns are analyzed to determine whether a corresponding pattern exists. Upon determining that a corresponding pattern exists, the corresponding pattern is added to the change list and then outputted.

In an example, a system includes a memory and a processor. The memory is in communication with the processor. The processor is configured to execute receiving a source code of an application that is compilable into an interpreted configuration. A database is then accessed, where the database includes a first plurality of patterns that are compilable into an interpreted configuration and fail to compile into a native compiled configuration. Within the database, a first plurality of patterns is associated with a first alternative pattern that is compilable into the interpreted configuration and compilable into the native compiled configuration. The source code is parsed to create a second plurality of patterns and analyzed with the first plurality of patterns to determine whether a corresponding pattern exists. Upon determining that the corresponding pattern exists, the corresponding pattern is added to a change list and then outputted.

In an example, a non-transitory machine readable medium storing code, when executed by a processor, is configured to receive a source code of an application that is compilable into an interpreted configuration. A database is accessed including a first plurality of patterns that are compilable into an interpreted configuration and fail to compile into a native compiled configuration. Within the database, a first pattern is associated with a first alternative pattern that is compilable into an interpreted configuration and the native compiled configuration. Next, the source code is parsed to create a second plurality of patterns and analyzed with the first plurality of patterns to determine whether a corresponding pattern exists. Upon determining that a corresponding pattern exists, the corresponding pattern is added to a change list and outputted.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION

Techniques are disclosed for detecting native compilation incompatibilities in applications originally written in an interpreted programming language. Recently, industry has made a paradigm shift from building desktop applications to hosting these same applications in the cloud. Generally, to increase speed and efficiency, the shift has included attempts to compile applications originally developed using interpreted programming languages (e.g., Java and C#) into native compiled applications. Typically, native compiled applications are more efficient as they consume lesser amounts of memory and have faster startup times when compared to applications compiled into an interpreted configuration. Thus, to facilitate application development for cloud environments, the industry would benefit from innovations that accelerate the software development process Generally, interpreted programming languages are designed for runtime variability and adaptability. In contrast, generally, when compiling an interpreted programming language into a native compiled application, the application needs to exist in a closed world where any potential variability is removed at compile time. This is contrary to the original intent and implementation of many interpreted languages, such as Java, where the flexibility of modifying the application at runtime is the standard method of expanding class functionality. Typically, variable items common to an application developed using an interpreted programming include, but are not limited to: dependencies, configuration, source code, and resources. Often, these two approaches are incompatible and compiling to native CPU instructions is generally limited to applications using curated libraries and frameworks. Generally, it is impossible to know, at development time, which libraries are suitable or whether source code of an application written in an interpreted programming language is even compatible with native compilation.

Additionally, typically, tools supporting native compilation of applications originally written in an interpreted programming language are limited. Generally, the most commonly used tools (e.g., GraalVM) require a runtime analysis of an application to facilitate native compilation. Typically, the complication with these tools is that each function and/or each use case needs to be specifically executed to allow the tools to analyze an application. Traditionally, if one or more functions are not analyzed during runtime, they cannot be analyzed. Generally, runtime analysis is extremely time consuming and, often, misses some functionality of an application.

As described in various examples disclosed herein, to advance development and debugging of natively compiled applications, the systems and methods disclosed herein advantageously analyzes the source code of an application statically during a build process of an application. In various examples, static analysis of an application is analysis of the application without actually executing the application. In these examples, a computer system may analyze an application's source during and/or before an initial compilation to an intermediary language (e.g., Java bytecode) and then compile the intermediary language to a native compiled application (e.g., native CPU instructions). The initial analysis may be based on the source code of an application and application dependencies, allowing for a comprehensive analysis of the application in its entirety.

In some examples, a system for statically analyzing source code and dependencies of an application may include a knowledge database containing heuristics and patterns that fail in a native compiled configuration. In these instances, a knowledge database may include categorizations of patterns. For example, a knowledge database may include a list (e.g., a black list) of patterns that are known to fail in a native compiled configuration where no known alternative pattern is capable of replacing the functionality. In other instances, a knowledge database may include a list (e.g., a white list) of patterns with one or more known working alternative patterns capable of replacing functionality of a known non-working pattern. In some instances, a knowledge database may include specific configurations of a compiler, or settings, which may enable native compilation of various libraries or patterns. In certain instances, a pattern may only be partially functional (i.e., not every function within a pattern executes properly in a native compiled configuration). In many instances, patterns that fail in the native configuration are associated with alternative patterns and/or workarounds that are viable replacements in the native compiled configuration.

In various examples, a computer system may receive a source code and dependencies of an application. In these instances, the source code of an application is parsed into a plurality of patterns. The plurality of patterns may be analyzed in context of the patterns and workarounds within the knowledge database. In some instances, each pattern of the plurality of patterns from an application may be compared with each pattern and/or heuristic within the knowledge database. When an incompatible pattern is detected within the source code, the computer system adds the incompatible source code pattern to a report. In some instances, the report is a change list of items within the source code of an application that may need to be modified before an application can successfully be compiled into a native compiled application. In various instances, the change list may also include workarounds (e.g., alternative patterns, native compiler instructions, or configuration information) that may be used in place of incompatible patterns.

In some instances, an incompatible source code pattern may be associated with, but not limited to, dynamic class loading, access to resources, service provider interface (SPI), serialization, and deserialization of objects. Similarly, if an application depends on an incompatible dependency, the dependency may be included in the change list, along with any potential working alternatives, if any exist. In various instances, an incompatible dependency is a dependency known to not be working in a native compiled configuration. In various examples, a computer system may facilitate replacement and/or implementation of one or more alternative patterns within the source code during analysis to repair native compilation incompatibilities.

Figure 1:
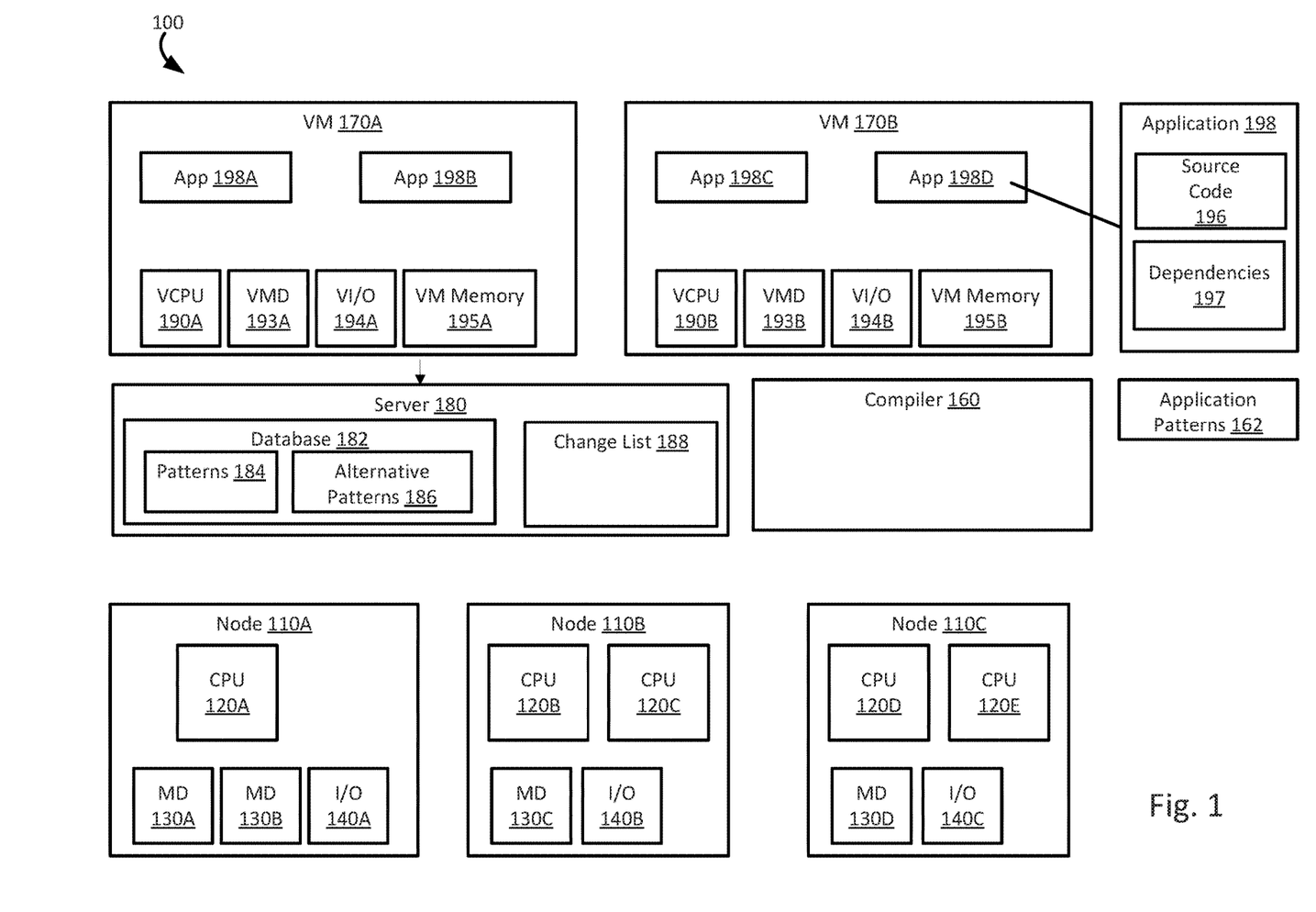
FIG. 1 illustrates a high level component diagram of an example computing system in accordance with one or more aspects of the present disclosure.

FIG. 1 depicts a high-level component diagram of an example computing system 100 in accordance with one or more aspects of the present disclosure. The computing system 100 may include a server 180, compiler 160, one or more virtual machines (VM 170A-B, 170 generally), and nodes (e.g., nodes 110A-C, 110 generally).

In various examples, a server 180 may include a database 182 and a change list 188. A database 182 may include one or more patterns 184 and one or more alternative patterns 186, both of which may implement various functionality. A change list 188 may include one or more patterns found within the source code 196 or dependencies 197 that are incompatible with native compilation. The computer system 100 may statically analyze the source code 196 and dependency 197 of application 198 (198A-D, 198 generally) in context of the patterns 184 found within the knowledge database 182. In some instances, the computer system is able to detect native compilation incompatibilities and incorporate alternative patterns 186 into the application 198. In other instances, the computer system 100 stores native compilation incompatibilities within the change list 188. In some instances, the computer system 100 stores alternative patterns 186 associated with the native compilation incompatibilities within the change list 188. In various instances, the server 180 may use the compiler 160 to parse and/or analyze the source code 196 and dependencies 197.

Virtual machines 170A-B may include a virtual machine memory (VM Memory), a virtual CPU (VCPU), virtual memory devices (VMD), and virtual input/output devices (VI/O). For example, virtual machine 170A may include virtual machine memory 195A, a virtual CPU 190A, a virtual memory devices 193A, and a virtual input/output device 194A. Similarly, virtual machine 170B may include virtual machine memory 195B, a virtual CPU 190B, a virtual memory devices 193B, and virtual input/output device 194B. In an example, Applications 198A-D may be different applications or services. In another example, applications 198A-D may be different instances of the same application or service.

In an example, a virtual machine 170A may execute a guest operating system and run applications 198A-B which may utilize the underlying VCPU 190A, VMD 193A, and VI/O device 194A. One or more applications 198A-B may be running on a virtual machine 170A under the respective guest operating system. A virtual machine (e.g., VM 170A-

B, as illustrated in FIG. 1) may run on any type of dependent, independent, compatible, and/or incompatible applications on the underlying hardware and operating system ("OS"). In an example, applications (e.g., App 198A-B) run on a virtual machine 170A may be dependent on the underlying hardware and/or OS. In another example embodiment, applications 198A-B run on a virtual machine 170A may be independent of the underlying hardware and/or OS. For example, applications 198A-B run on a first virtual machine 170A may be dependent on the underlying hardware and/or OS while applications (e.g., application 198C-D) run on a second virtual machine (e.g., VM 170B) are independent of the underlying hardware and/or OS. Additionally, applications 198A-B run on a virtual machine 170A may be compatible with the underlying hardware and/or OS. In an example embodiment, applications 198A-B run on a virtual machine 170A may be incompatible with the underlying hardware and/or OS. For example, applications 198A-B run on one virtual machine 170A may be compatible with the underlying hardware and/or OS while applications 198C-D run on another virtual machine 170B are incompatible with the underlying hardware and/or OS.

In an example, virtual machines 170A-B may instead be containers that execute applications or services, such as microservices. In an example, the containers may each run a process or service and the containers may be any execution environment. For example, the containers may be a virtual server. It should be appreciated that containers may be stand alone execution environments, similar to that of a virtual machine. The applications 198A-D or services (e.g., microservices) may run in a software container or a virtual machine (e.g., virtual machines 170A-B).

The computer system 100 may include one or more nodes 110A-C. Each node 110A-C may in turn include one or more physical processors (e.g., CPU 120A-E) communicatively coupled to memory devices (e.g., MD 130A-D) and input/output devices (e.g., I/O 140A-C). Each node 110A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. Virtual machines 170A-B may be provisioned on the same host or node (e.g., node 110A) or different nodes. For example, VM 170A and VM 170B may both be provisioned on node 110A. Alternatively, VM 170A may be provided on node 110A while VM 170B is provisioned on node 110B.

As used herein, physical processor or processor 120A-E refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-D refers to a volatile or non-volatile memory device, such as RAM, ROM, EEPROM, or any other device capable of storing data. As discussed herein, I/O device 140A-C refers to a device capable of providing an interface between one or more processor pins and an external device capable of inputting and/or outputting binary data.

Processors (e.g., CPUs 120A-E) may be interconnected using a variety of techniques, ranging from a point-to-point processor interconnect, to a system area network, such as an Ethernet-based network. Local connections within each node, including the connections between a processor 120A-E and a memory device 130A-D may be provided by one or more local buses of suitable architecture, for example, peripheral component interconnect (PCI).

Figure 2:
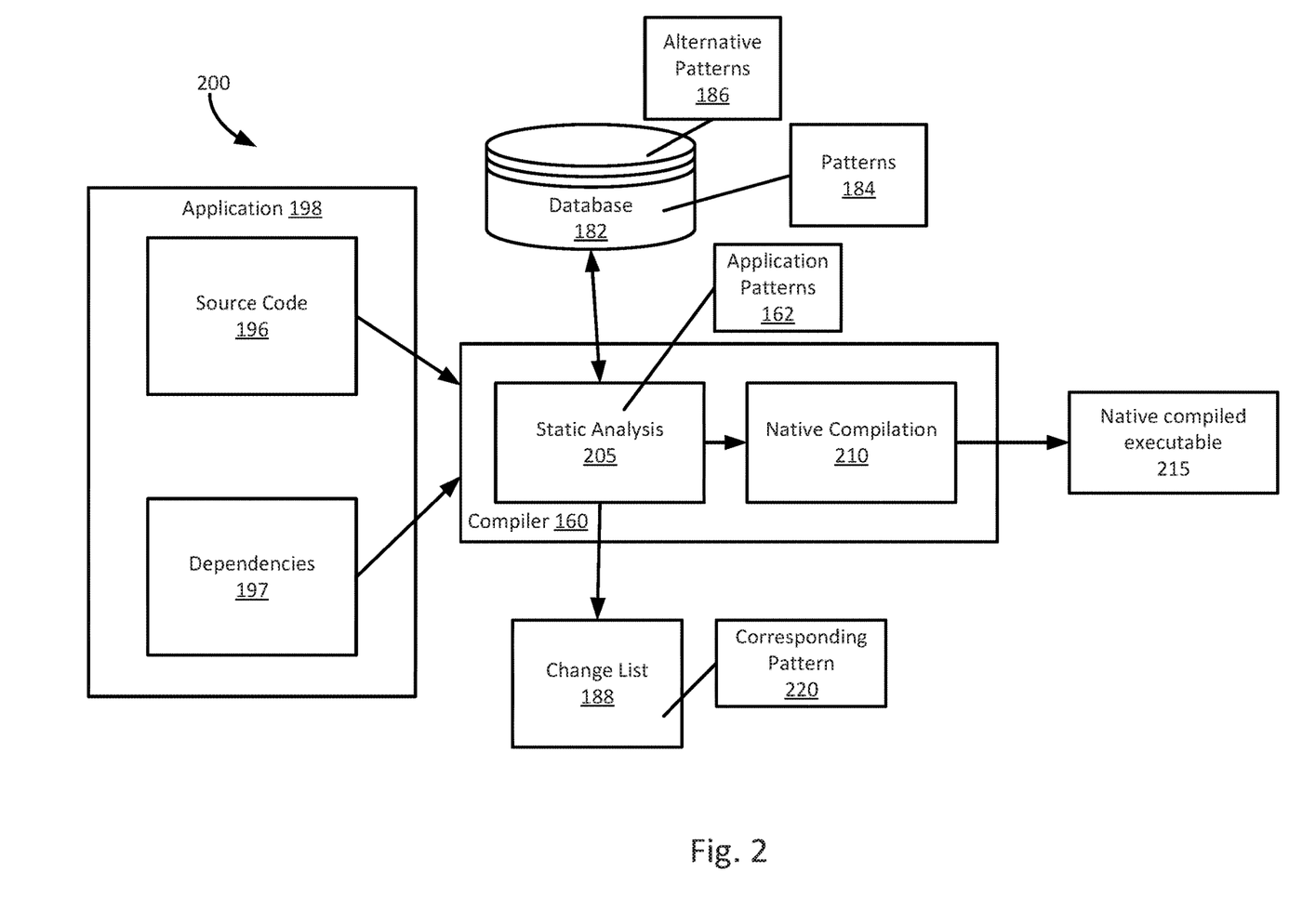
FIG. 2 illustrates a block diagram of an example system analyzing source code and application dependencies, in accordance with an example embodiment of the present disclosure.

FIG. 2 depicts a block diagram of an example of a compiler analyzing source code and dependencies of an application, in accordance with an embodiment of the present disclosure. The computer system 200 includes a knowledge database 182 and compiler 160. The knowledge database 182 includes patterns 184 and alternative patterns 186. The compiler 160 includes a static analysis module 205 and a native compilation module 210. In various examples, the patterns 184 include one or more patterns that do not compile and do not function in a native compiled configuration. The alternative patterns 186 include one or more patterns, which are alternative implementations of at least one pattern from patterns 184. In some examples, patterns 184 includes one or more patterns that do not function in a native compiled configuration and have no alternative implementation. In these instances, an application may require at least some redesign to function in a native compiled configuration.

As shown, the compiler 160 is statically analyzing the source code 196 and dependencies 197 of application 198 to determine whether the source code 196 or dependencies 197 include incompatible patterns. For example, initially, the compiler receives the source code 196 and dependencies 197 and parses the source code 196 to create application patterns 162. In some instances, the compiler 160 parses the dependencies 197. In other instances, the compiler 160 recognizes the dependencies 197 as a single library and/or pattern which is included in the application patterns 162. The compiler 160 accesses the knowledge database 182 and compares the application patterns 162 with the patterns 184. If any of the application patterns 162 correspond to a pattern included in patterns 184, the corresponding pattern 220 is included in the change list. Additionally, if any alternative patterns 186 are associated with any corresponding pattern 220 added to the change list 188, those associated patterns are added to the change list 188. Upon a determination that no native compilation incompatibilities exist, or modifications have been made to the source code 196 to fix any native compilation incompatibilities, the compiler 160 uses a native compilation module 210 to compile the source code 196 and dependencies 197 into native compiled executable 215.

Figure 3:
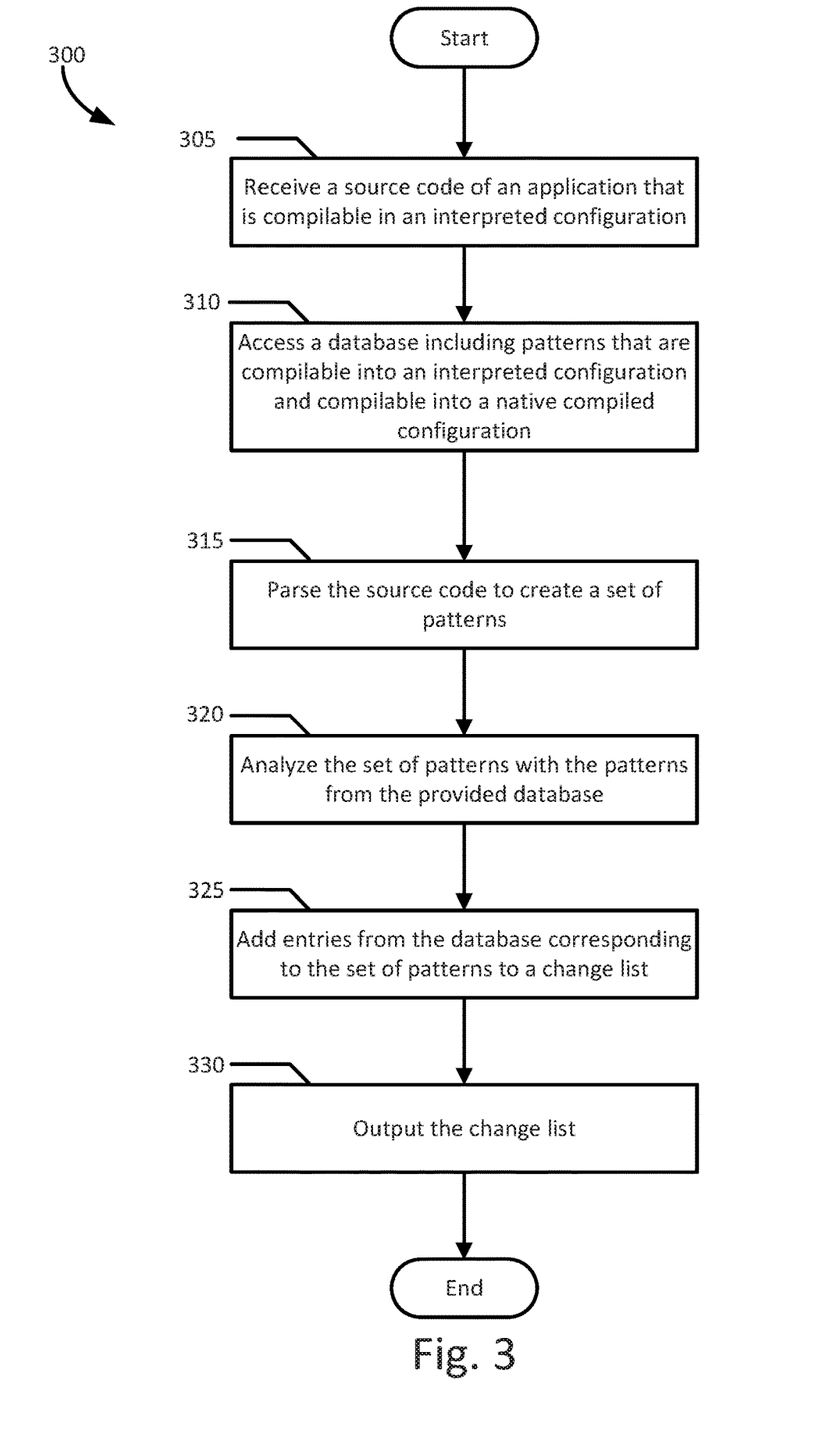
FIG. 3 illustrates a flowchart of an example method for detecting native compilation incompatibilities according to an example embodiment of the present disclosure.

FIG. 3 illustrates a flowchart of an example method for detecting native compilation incompatibilities, in accordance with an embodiment of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, blocks may be repeated and some of the blocks described are optional. The method 300 may be performed by processing logic that may comprise hardware (circuitry, dedicated logic, etc.), software, or a combination of both.

A compiler receives a source code of an application that is compilable in an interpreted configuration (block 305). For example, and application 198 developed in an interpreted programming language is capable of functioning in an interpreted configuration (e.g., Java bytecode), but not necessarily functional or compilable into a native compiled configuration (e.g., into native CPU instructions). The application 198 includes source code 196 and dependencies 197, which both need to be compilable into a native compiled configuration in order function as a native compiled application. The compiler accesses a database which includes patterns that are compilable into an interpreted configuration and compilable into a native compiled configuration (block 310). For example, the compiler 160 is able to access a knowledge database 182 on the server 180. The knowledge database 182 includes patterns 184 which are known to not compile in a native compilation configuration. The knowledge database 182 also includes alternative patterns 186 where each of the alternative patterns 186 are associated with at least one of the patterns 184.

Next, the source code is parsed to create a set of patterns (block 315) and analyzed using the patterns in the knowledge database (block 320). In various instances, static analysis of the application 198 is facilitated by the source code 196 being split into patterns. For example, during static analysis of the application 198, the source code 196 may be parsed into application patterns 162 (i.e., smaller functional portions) that can be compared with the patterns 184 within the knowledge database 182. Unlike with runtime analysis tools (e.g., GraalVM), the computer system 200 can determine native compilation incompatibilities of the full functionality of an application 198 through analysis of the source code 196 and dependencies 197. In this example, the application patterns 162 and patterns 184 are compared to determine whether corresponding patterns exist. Corresponding patterns 220 are patterns known to not function and/or not compile in a native compilation configuration.

Next, the corresponding patterns are added to a change list (block 325) and the change list is outputted (block 330). For example, the patterns that correspond between the application patterns 162 and the patterns 184 are added to the change list 188 and output from the compiler 160. In various instances, alternative patterns 186, which are associated with one or more patterns 184, are also added to the change list 188. The alternative patterns 186 are functional replacements of one or more of the application patterns 162 that are non-functional in a native compiled configuration. In some instances, the change list 188 is a file. In other instances, the change list 188 is a report.

Figure 4:
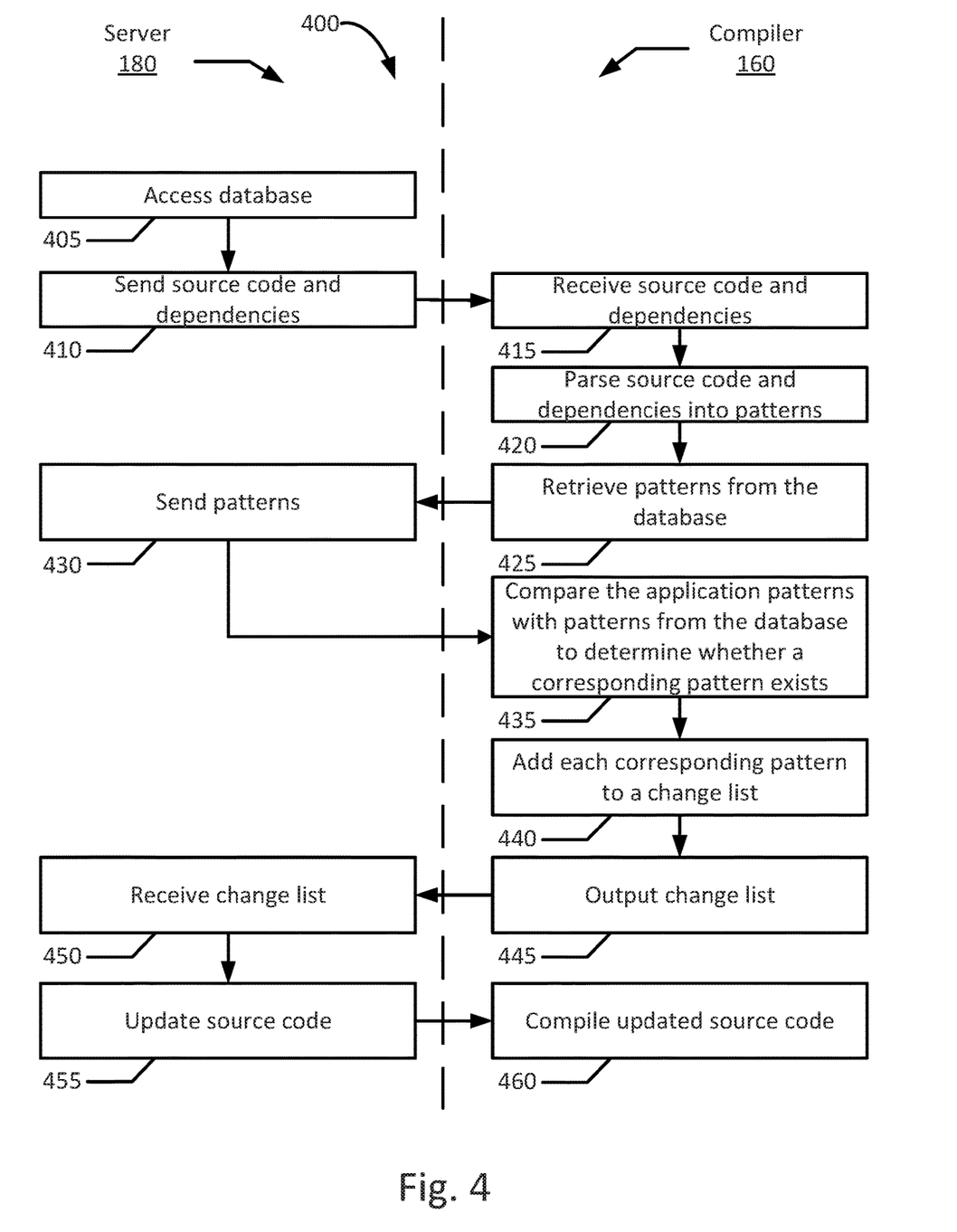
FIG. 4 illustrates a flow diagram of an example method of repairing native compilation incompatibilities, in accordance with an embodiment of the present disclosure.

FIG. 4 illustrates a flow diagram of an example method of repairing an application having native compilation incompatibilities, in accordance with an embodiment of the present disclosure. Although the example method 400 is described with reference to the flow diagram illustrated in FIG. 4, it will be appreciated that many other methods of performing the acts associated with the method 400 may be used. For example, the order of some of the blocks may be changed, certain blocks may be combined with other blocks, blocks may be repeated, and some of the blocks described are optional. For example, in the illustrated flow diagram, a server 180 utilizes a compiler 160 while analyzing and/or debugging issues while native compiling the application 198.

As shown, the server 180 accesses the knowledge database 182 (block 405) and sends the source code 196 and dependencies 197 to the compiler 160 (block 410). Upon receiving the source code 196 and dependencies 197 (block 415), the compiler 160 initiates a static analysis of the source code 196 and the dependencies 197. As shown, the compiler 160 parses the source code 196 and dependencies 197 into patterns 162 (block 420). Next, the compiler 160 retrieves patterns 184 from the knowledge database 182 (block 425). The server 180 returns a link to the patterns 184 (block 430). Next, the compiler 160 compares the application patterns 162 with patterns 184 to determine whether a corresponding pattern exists (block 435). Upon a determination that a corresponding pattern 220 exists, the compiler 160 adds each corresponding pattern 220 to a change list 188 (block 440) and outputs the change list 188 (block 445). Once the server 180 receives the change list 188 (block 450), the server 180 updates the source code 196 (block 455). For example, source code 196 may be automatically updated based on the change list 188 to make the source code 196 native compilable. In some instances, the compiler 160 may incorporate changes based on the change list 188. The server 180 sends the source code 196 to the compiler 160 to compile the updated source code (block 460). For example, upon implementation of any changes included in the change list 188, the source code 196 becomes native compilable. As such, the compiler 160 compiles the source code 196 and dependencies 197 into native CPU instructions. In various instances, updates to the source code 196 based on change list 188 may be made at a later time. In these instances, the compiler 160 does not automatically compile the source code 196 into the native compiled executable.

Figure 5:
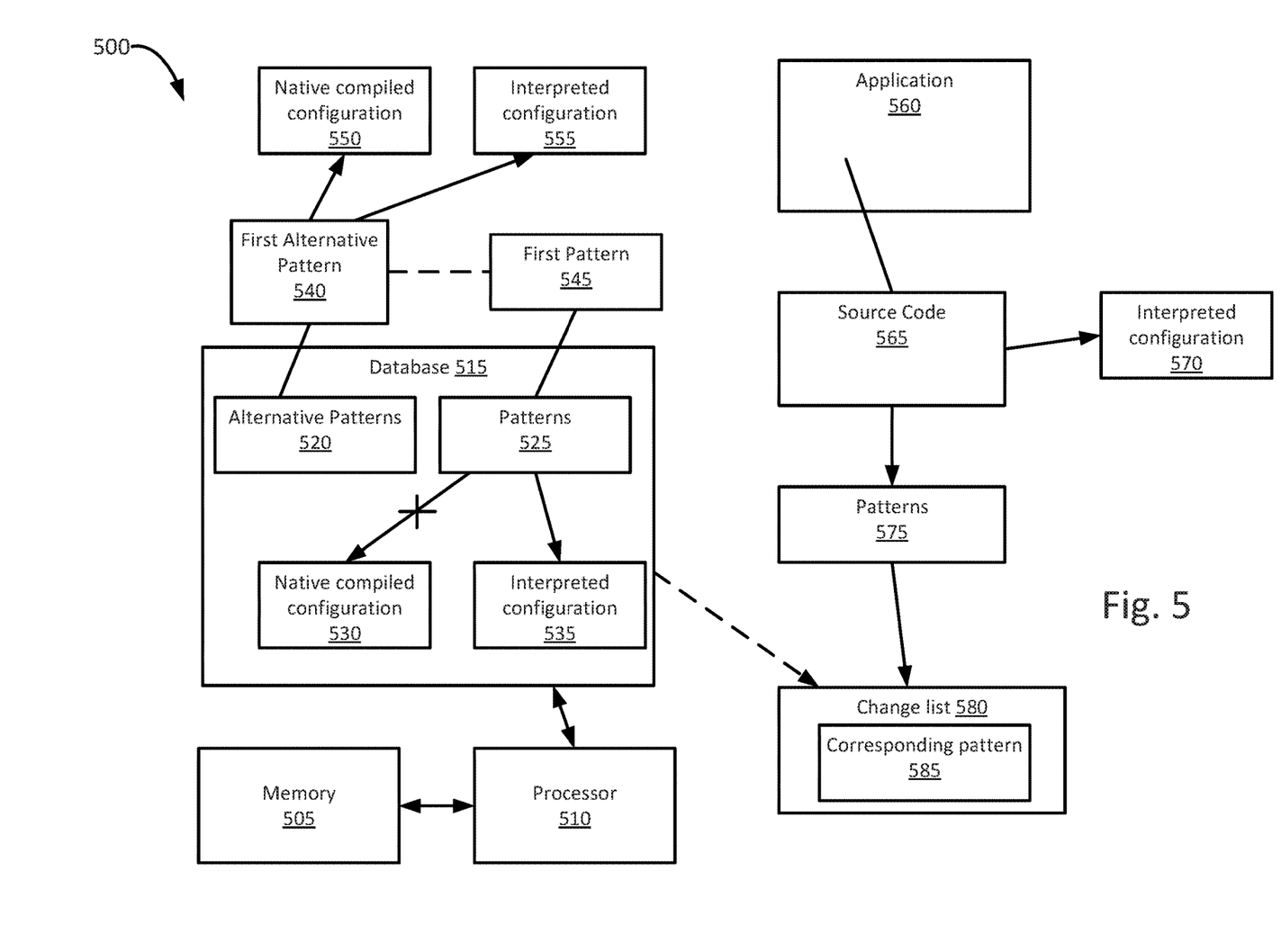
FIG. 5 illustrates a block diagram of an example system detecting and repairing native incompatibilities in an application according to an example embodiment of the present disclosure.

FIG. 5 is a block diagram of system 500, which includes memory 505 and processor 510. The processor 510 is in communication with the memory 505. The processor 510 is configured to perform receiving a source code 565 of an application 560 that is compilable into an interpreted configuration 570. A database 515 is accessible and includes patterns 525. The patterns 525 are known to be compilable into an interpreted configuration 535 and fail to compile into a native compiled configuration 530. In this instance, a first pattern 545 of the patterns 525 is associated with a first alternative pattern 540 of the alternative patterns 520. The first alternative pattern 540 is compilable into the interpreted configuration 555 and compilable into the native compiled configuration 550. The source code 565 is parsed into patterns 575 and analyzed with patterns 525 to determine whether a corresponding pattern 585 exists. Upon determining that the corresponding pattern 585 exists, the corresponding pattern 585 is added to the change list 580 and outputs the change list 580.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:
1. A method, comprising:
  receiving a source code of an application that is compilable into an interpreted configuration;
  accessing a database including a first plurality of patterns that are compilable into the interpreted configuration and fail to compile into a native compiled configuration, wherein a first pattern of the first plurality of patterns is associated with a first alternative pattern that is compilable into the interpreted configuration and compilable into the native compiled configuration;
parsing the source code to create a second plurality of patterns;
analyzing the first plurality of patterns and the second plurality of patterns to determine whether a corresponding pattern exists;
upon determining the corresponding pattern exists, adding the corresponding pattern to a change list;
outputting the change list; and
upon detecting a pattern from the second plurality of patterns that is compilable into the interpreted configuration and not compilable into the native compiled configuration, where the pattern is not included in the first plurality of patterns, adding the pattern to the first plurality of patterns within the database.

2. The method of claim 1, wherein analyzing comprises:
comparing a first pattern of the second plurality of patterns with each pattern of the first plurality of patterns to determine whether the corresponding pattern exists.

3. The method of claim 1, wherein at least one entry of the change list is associated with at least one alternative pattern that is compilable into the interpreted configuration and compilable into the native compiled configuration.

4. The method of claim 3, further comprising:
adding the at least one alternative pattern associated with the at least one entry of the change list to the change list.

5. The method of claim 1, wherein each entry of the change list is associated with a first designation or a second designation indicating whether an alternate pattern of each entry of the change list exists.

6. The method of claim 1, wherein the first plurality of patterns includes a second pattern configured to dynamically load a class.

7. The method of claim 1, wherein the first plurality of patterns includes a second pattern configured to provide a service provider interface.

8. The method of claim 1, wherein the first alternative pattern is an alternative implementation of the first pattern.

9. The method of claim 1, further comprising updating the source code based on the change list.

10. A system, comprising:
a memory; and
a processor in communication with the memory, wherein the processor is configured to execute:
receiving a source code of an application that is compilable into an interpreted configuration;
accessing a database including a first plurality of patterns that are compilable into the interpreted configuration and fail to compile into a native compiled configuration, wherein a first pattern of the first plurality of patterns is associated with a first alternative pattern that is compilable into the interpreted configuration and compilable into the native compiled configuration;
parsing the source code to create a second plurality of patterns;
analyzing the first plurality of patterns and the second plurality of patterns to determine whether a corresponding pattern exists;
upon determining the corresponding pattern exists, adding the corresponding pattern to a change list;
outputting the change list; and
upon detecting a pattern from the second plurality of patterns that is compilable into the interpreted configuration and not compilable into the native compiled configuration, where the pattern is not included in the first plurality of patterns, adding the pattern to the first plurality of patterns within the database.

11. The system of claim 10, wherein analyzing comprises:
comparing a first pattern of the second plurality of patterns with each pattern of the first plurality of patterns to determine whether the corresponding pattern exists.

12. The system of claim 10, wherein at least one entry of the change list is associated with at least one alternative pattern that is compilable into the interpreted configuration and compilable into the native compiled configuration.

13. The system of claim 12, wherein the processor is further configured to execute:
adding the at least one alternative pattern associated with the at least one entry of the change list to the change list.

14. A non-transitory machine readable medium storing code, which when executed by a processor, is configured to cause the processor to:
receive a source code of an application that is compilable into an interpreted configuration;
access a database including a first plurality of patterns that are compilable into an interpreted configuration and fail to compile into a native compiled configuration, wherein a first pattern of the first plurality of patterns is associated with a first alternative pattern that is compilable into an interpreted configuration and the native compiled configuration;
parse the source code to create a second plurality of patterns;
analyzing the first plurality of patterns and the second plurality of patterns to determine whether a corresponding pattern exist;
upon determining the corresponding pattern exists, add the corresponding pattern to a change list;
output the change list; and
upon detecting a pattern from the second plurality of patterns that is compilable into the interpreted configuration and not compilable into the native compiled configuration, where the pattern is not included in the first plurality of patterns, add the pattern to the first plurality of patterns within the database.

15. The non-transitory machine readable medium of claim 14, wherein analyzing comprises:
comparing a first pattern of the second plurality of patterns with each pattern of the first plurality of patterns to determine whether the corresponding pattern exists.

16. The non-transitory machine readable medium of claim 14, wherein at least one entry of the change list is associated with at least one alternative pattern that is compilable into the interpreted configuration and compilable into the native compiled configuration.

17. The non-transitory machine readable medium of claim 16, wherein the code, when executed by the processor, is further configured to cause the processor to:
add the at least one alternative pattern associated with the at least one entry of the change list to the change list.

18. The non-transitory machine readable medium of claim 14, wherein each entry of the change list is associated with a first designation or a second designation indicating whether an alternate pattern of each entry of the change list exists.

* * * * *